US009975719B2

(12) United States Patent
Muhl (10) Patent No.: US 9,975,719 B2
(45) Date of Patent: May 22, 2018

(54) TRANSPORT MODULE FOR FLAT ITEMS

(71) Applicant: Wolfgang Muhl, Hohen Neuendorf (DE)

(72) Inventor: Wolfgang Muhl, Hohen Neuendorf (DE)

(73) Assignee: Francotyp-Postalia GmbH, Berlin (DE)

( * ) Notice: Subject to any disclaimer, the term of this patent is extended or adjusted under 35 U.S.C. 154(b) by 0 days. days.

(21) Appl. No.: 15/148,252

(22) Filed: May 6, 2016

(65) Prior Publication Data

US 2016/0325952 A1 Nov. 10, 2016

(30) Foreign Application Priority Data

May 7, 2015 (DE) .......................... 20 2015 102 333
Apr. 12, 2016 (DE) .......................... 20 2016 101 920

(51) Int. Cl.
*B65H 5/06* (2006.01)
*B65H 9/16* (2006.01)
(Continued)

(52) U.S. Cl.
CPC ................ *B65H 9/04* (2013.01); *B65H 1/06* (2013.01); *B65H 3/063* (2013.01); *B65H 3/0638* (2013.01); *B65H 3/0669* (2013.01); *B65H 3/0676* (2013.01); *B65H 3/5238* (2013.01); *B65H 3/54* (2013.01); *B65H 3/565* (2013.01); *B65H 5/062* (2013.01); *B65H 5/066* (2013.01); *B65H 7/00* (2013.01); *B65H 7/02* (2013.01); *B65H 9/166* (2013.01); *B65H 27/00* (2013.01); *B65G 39/025* (2013.01); *B65H 2403/5331* (2013.01); *B65H 2403/92* (2013.01); *B65H 2404/1314* (2013.01);
(Continued)

(58) Field of Classification Search
CPC ........ B65H 5/062; B65H 5/066; B65H 3/063; B65H 3/0638; B65H 3/0669; B65H 2404/15212; B65H 2404/14212; B65H 1/06; B65H 9/16; B65H 9/166; B65G 13/065; B65G 39/025
See application file for complete search history.

(56) References Cited

U.S. PATENT DOCUMENTS 4,399,675 A 8/1983 Erdmann et al.
4,973,037 A 11/1990 Holbrook
(Continued)

FOREIGN PATENT DOCUMENTS

DE 202011107379 U1 1/2012
WO WO-2014/066838 A1 5/2014

*Primary Examiner* — Luis A Gonzalez
(74) *Attorney, Agent, or Firm* — Schiff Hardin LLP (57) ABSTRACT

A transport module for flat items comprising at least one transport element borne in a transport element carrier having a drive shaft is designed for installation in a station of an item processing system and, after installation, is borne rotatably around an axis of the drive shaft. It is one of multiple transport modules of an identical design. The transport element has, on one side, a lower friction coefficient than on the other side of an equator and is driven by the drive shaft via transmission means of the transport module. The transport element carrier carries the transmission means of the transport module and has a spring assembly allowing it to be shifted in the direction of gravity and contrary to it.

10 Claims, 6 Drawing Sheets

(51) Int. Cl.
  *B65H 9/04* (2006.01)
  *B65H 1/06* (2006.01)
  *B65H 3/06* (2006.01)
  *B65H 3/56* (2006.01)
  *B65H 3/52* (2006.01)
  *B65H 7/02* (2006.01)
  *B65H 3/54* (2006.01)
  *B65H 7/00* (2006.01)
  *B65H 27/00* (2006.01)
  B65G 39/02 (2006.01)

(52) U.S. Cl.
  CPC ............. *B65H 2404/1544* (2013.01); *B65H 2404/15212* (2013.01); *B65H 2404/15422* (2013.01); *B65H 2404/623* (2013.01); *B65H 2701/1916* (2013.01); *B65H 2801/78* (2013.01)

(56) References Cited

U.S. PATENT DOCUMENTS

| | | | |
|---|---|---|---|
| 9,045,295 B2* | 6/2015 | Bubbio | B65H 9/166 |
| 2003/0150079 A1 | 8/2003 | Takai et al. | |
| 2005/0225028 A1 | 10/2005 | Lawless et al. | |
| 2014/0116841 A1* | 5/2014 | Wilkins | B65G 13/065 |
| | | | 198/369.1 |
| 2015/0217939 A1* | 8/2015 | Wilkins | B65G 39/025 |
| | | | 198/494 |

* cited by examiner

TRANSPORT MODULE FOR FLAT ITEMS

BACKGROUND OF THE INVENTION

Field of the Invention

The invention refers to a transport module for flats items of the type that can be used e.g. in item processing systems, in particular in a first station at the start of a mail line.

Description of the Prior Art

A mail line of a franking system is composed of successively arranged individual mail item processing stations and the flat items are mail items. At the start of the mail line, a placement station can be arranged as the first or $n^{th}$ station. The placement station serves to place individual or stacked mail items that are transported in downstream direction of the mail-item flow through further stations up to the end of the mail line to a deposit device. A stack may contain mail items of different formats (mixed mail items).

The term mixed mail items shall also include mail items of similar formats differing in height and width within narrow limits, such as for example envelopes of the formats B6 (12.5×17.6 cm) and C6 (11.4×16.2 cm). The more frequently used envelopes of the formats C6, C6long C5, B4 and postcards have different widths and lengths. Envelopes are available in various standard sizes as defined in ISO 269 and DIN 678 to a large extent according to existing paper formats. The letter categories of Deutsche Post AG differ with regard to weight and letter dimensions. They comprise the postcard (up to 150 g) in the DIN format A6, the standard letter (up to 20 g) and the compact letter (up to 50 g) in fitting DIN formats C6, B6, C5/6 (DL), C6/5 as well as the large letter (up to 500 g) and the maxi letter (up to 1000 g) in fitting DIN formats C6, B6, C5/6 (DL), C6/5, C5, B5, C4, B4.

When speaking of a stack below, this shall mean letter stacks, postcard stacks, mail-item stacks or other stacked items or stacked flat items that can be singularized and fed lying on their side.

The German utility model DE 20 2011 107 379 U1 already proposed a modular placement device for a feeding station. The placement device is designed as a module for merely manual operation without drive technology. The mail items are placed on a raisable ramp and moved in transport direction by the effect of gravity. However, a processing of mixed mail items is not provided.

There are already provided means for transporting the mail items in downstream direction as well as also in direction to the alignment wall as well as for loosening up the mail items (open or closed filled envelopes) of a stack so that they can slide more easily over one another. There was also proposed a multiple inclining of the mail item stack plate in the stack magazine area in order to use gravity for aligning the mail items. By a multiple inclining of the mail item stack plate in the stack magazine area, the envelope may get jammed when passing into the feeding sector in a horizontal position, in particular with an open envelope flap. Due to the small angular range, an alignment of the mail items on the alignment wall is only possible to a limited extent.

The transport means of a feeding station known from U.S. Pat. No. 4,973,037 are eccentrically designed loosening rollers with different friction coefficients that, during a rotation of the loosening roller, alternatingly come up over and go under a placement deck so that a lowermost flat item of a stack of flat items is intermittently contacted. The friction on the rollers while the flat items are intermittently contacted and the force needed for lifting the stack is very high in case of high and heavy stacks. With a very high traction (friction value), a lowermost flat item may hit against an alignment wall of the placement station and get crumpled or damaged. A plurality of roller groups of loosening rollers is driven by a first motor that must deliver the required force. The plurality of roller groups of loosening rollers is arranged in a rack that can be periodically moved back and forth within a small angular range by means of a second motor and a control disc. The use of such loosening rollers with a force periodically acting on a stack, however, causes an uneven run with an increased noise level. The coupling of undesired oscillation considerably interferes with a dynamic weight measurement in a franking system. Despite the movement of roller groups in an angular range, a direction alignment of the roller groups in any direction is not possible. It is another disadvantage of the rollers that the mail items cannot be shifted transversely to the transport direction as long as the rollers still extend above the placement deck, i.e. before they go down below the placement deck.

It is known that, with a higher throughput (e.g. higher stack) of flat items, the error rate in the placement of the mail items of the same mail type on an alignment wall of the placement station increases, too. Therefore, there is an interest in reducing the error rate and increasing the singularization reliability for a singularization device arranged downstream in the mail item flow.

It is a problem to create a transport module for a flat item which does not have the above-mentioned disadvantages. The transport module for flat items shall in particular be developed for the placement of mail items of the same mail type on an alignment wall of the placement station and designed in such a way that also a plurality of transport modules can be easily installed in a placement device or in the placement station and each transport module can be individually exchanged. A stack of flat items with different widths and lengths up to a difference of 20 mm correctly placed on the alignment wall shall be processed free from errors, without the flat items, during processing of the stack, turning away from the alignment wall before they are drawn into a singularization device of a singularization station. Therefore, every transport module shall be slewable into any alignment direction and rotatable into a transport direction of the flat items and have a driven transport element for the flat items, so that the flat items not lying on the alignment wall are automatically pushed to the alignment wall on the placement deck and/or transported in the transport direction of the flat items. The driven transport element of the transport module shall be equipped with free-wheeling. Each transport element shall be drivable on a plane, turned into any alignment direction. Moreover, each transport module shall allow for a limitation of the friction value and accommodate the transmission means of a movement mechanism that transfers the drive energy of a single drive motor of a placement station to the transport element of each transport module with the lowest possible loss.

SUMMARY OF THE INVENTION

The above problem is solved by the features of the transport module according to the invention wherein each transport module among a plurality of transport modules is made for installation in a station of an item processing systems and is of an equal (the same) design. A transport element carrier has spring means and carries at least one transport element that has a lower friction value on the one side than on the other side of an equator and is driven by a drive shaft via transmission means of the transport module, said transport element carrier carrying the transmission means of the transport module and having spring means. Each transport module that is arranged in a station of an item processing system and is borne rotatably around an axis of the drive shaft can be shifted contrary to a spring force F1 in the direction of gravity and contrary to it in z-direction. The installed transport module is borne rotatably around an axis of the drive shaft It was found by experiments that there is required a plurality of transport modules in a pre-defined arrangement that are installed below the placement deck and extend with their upper part through openings in the placement deck. Each upper part contains one driven transport element of a certain ball-shaped or spherical shape. On the other hand, it was empirically determined that the transport elements arranged near the alignment wall do not need a randomly adjustable direction alignment device and only need one fixed alignment direction when the flat items can be shifted transversely to the alignment direction via the transport elements in direction to the alignment wall, wherein only a sliding friction occurs between the transport elements and the flat item. There were also empirically determined the necessary angles of the direction alignment for the other transport elements required for individual letter format sizes and their surface quality as well as for a certain transport speed. Furthermore, it is provided to shape the transport modules in such a way that each transport element can go down into the placement deck of the placement station independently from the other transport elements. Each transport element is subjected to a force F1 contrary to the direction of gravity by a spring. When a mail stack is placed on the transport elements, there results a weight due to the effect of gravity on its mass. That force F12 acts on the transport elements in the direction of gravity contrary to the force F1 of a spring. This way, the individual transport elements optimally adjust to the bottom side of the mail items, also in case of uneven mail items. After the force F2 has exceeded the spring force F1, the force F2 is proportionally transferred on the surface of the placement deck, which limits the traction effect of the transport elements because the transport elements can go down into the placement deck of the placement station until the mail item lies flatly on the placement deck. Thus, the predefined maximum friction coefficient of the individual transport elements is limited, independently from the force F2≥F1. With a suitable combination of materials, the friction surfaces do not move relatively to one another. The maximum friction value of the transport elements depends on the materials combination, for example for rubber on paper, μH is in the range of 0.5 to 1.3 and for plastic on paper, μH is in the range of 0.1 to 0.25.

With a stack of flat items placed on the placement deck, there occurs adhesive friction already due to the stack weight. For traction, the transport element exerts a force component FR in transport direction, which is also called frictional force. A resulting force has the force component FR in transport direction as well as a force component F2 acting in the direction of gravity, i.e. contrary to a z-direction. The pressure force F2 can be formed jointly by an additional weight or spring force and the weight of the stack. It acts in the direction of gravity and is also called normal force. With a given pressure by the force F2, a maximum tangential force can be transmitted in transport direction or in another alignment direction, wherein the following equation applies to the maximum adhesive friction:

$$FR,\max = \mu H \cdot F2 \quad (1)$$

There applies:

$$\mu H = \tan(\varphi) \quad (2)$$

The tangent of the friction angle φ between the above-mentioned resulting force and the normal force F2 results in a friction coefficient μH that is also called friction value. The friction value μH defines how big the friction force FR is in relation to the normal force F2.

There is provided a transport element carrier in each transport module that has two lateral legs, a carrier yoke and a drive shaft, at least one transport element being mounted in a carrier ring.

The carrier ring passes in the direction of gravity into the two lateral legs that are connected with each other on their end by the carrier yoke, the lateral legs and the carrier yoke being arranged in the form of a frame.

The drive shaft projects in the direction of gravity from an installed transport element carrier to a length corresponding at least to a sum of a first distance A and a height h, the first distance A being provided for a common drive of a plurality of transport modules and the height h corresponding to a height H of a circle segment on the equator of a cross section of the transport element that is effective for the traction.

Every transport element consists of a molded body of rotation rotatable around a rotation axis with a barrel-shaped rubber coat, said rotation axis running through the center of a cross section of a first straight rotary shaft that runs in bearings borne in the lateral legs of the carrier. The transport element has its biggest radius in the center on the barrel equator. The barrel-shaped rubber coat applied on the molded body of rotation is asymmetrically arranged in relation to its barrel equator so that, on the one side of the barrel equator, the surface of the transport element passes into a lateral running surface of the molded body of rotation that has a lower friction value than the rubber coat, e.g. a friction value that is at least 50% lower.

A fixed straight axle is arranged in parallel to the first straight rotary shaft at a second distance B below the first straight rotary shaft in the direction of gravity and mounted in the lateral legs of the carrier at a third distance C from the inner wall on the bottom of the carrier yoke.

The carrier yoke has in its center a bearing hole with a pre-defined bearing diameter for a first and a second radial slide bearing of the drive shaft.

The drive shaft has a diameter D and is rotatably mounted in the first and second radial slide bearings, wherein the slide bearings of a transport module installed below a placement deck of a placement station are mounted flush with a bearing hole of a bearing plate in such a manner that the axis of the transport element carrier runs through the center of the cross section of the drive shaft and through the center of the bearing hole A first gear wheel is mounted by positive joint on the first straight rotary shaft and a second gear wheel is rotatably borne on the fixed straight bearing axle, wherein, after their assembly in the transport element carrier, the teeth of said first and second gear wheels are in engagement.

A first bevel gear is connected by positive joint with the drive shaft. A second bevel gear and the second gear wheel are jointly mounted on the second bearing shaft and connected with each other by positive joint and/or firm bonding, wherein the two bevel gears are oriented to one another and mounted in the transport element carrier to form a bevel-gear rolling-contact gear unit.

A plurality of transport modules of a station of an item processing system can be installed on a bearing plate. The spring means mounted on the carrier act with a spring force F1 between the carrier yoke and the bearing plate so that a fourth distance E between the surface of the placement deck and a surface of a retaining ring of the transport element of the assembled transport module is minimal when no pressure force F2 or weight of a flat item is acting on the transport element.

The bearing plate is provided in a between-deck manner and in parallel at a distance G to the placement deck of the placement station so that there is formed an inner space inside the placement station in which all transport modules can be installed on the bearing plate.

It is provided that every transport module has a drive shaft driving the transport element via transmission means and that the drive shaft extends through the bearing plate, wherein the alignment of the drive shaft corresponds to the alignment of the rotation axis of the transport module. The transport modules are arranged on the bearing plate shiftable against the spring force F1 of the spring means in the direction of gravity. Preferably, the spring means is a tension spring that is pre-tensioned when installed on the bearing plate of a station of an item processing system.

The drive shafts of a plurality of transport modules arranged on the bearing plate of a station of an item processing system can be installed in a manner respectively assigned to a toothed belt disc that is part of a drive mechanism. The drive mechanism has a common part acting on the transport elements of all transport modules and, in addition, each transport module also has separate transmission means in order to supply the transport elements with a required drive energy.

A drive unit installed in a placement station with the related drive mechanism for all transport modules is electronically driven by a control unit. The drive unit can be electrically driven by a control unit in the placement station or by a control unit in a singularization station arranged downstream in the mail-item flow. This control unit contains a program memory for a program providing the profiles for operating time and speed of the transport elements.

In order to allow for the drive mechanism can transmit the drive energy of a single drive motor via transmission means with the lowest possible loss to the transport element of the transport module while a direction alignment of the transport element is still possible, the transport module has a frame-shaped transport element carrier for the transmission means of the transport element.

After assembly, the transport modules are arranged below the placement deck. Below the placement deck, there is also provided an arrangement of a direction alignment mechanism for the transport module that is mechanically coupled with an annular external gear rim of the frame-shaped transport element carrier. Via a movement mechanism for changing the alignment direction of some of the transport elements, an actuating means can be mechanically coupled with a toothed rack of the direction alignment mechanism.

Below the frame-shaped transport element carrier, there is also provided a space for a common drive mechanism. The common drive mechanism comprises at least one toothed belt disc per transport module that is driven by a toothed belt.

DESCRIPTION OF THE PREFERRED EMBODIMENTS

Figure 1:
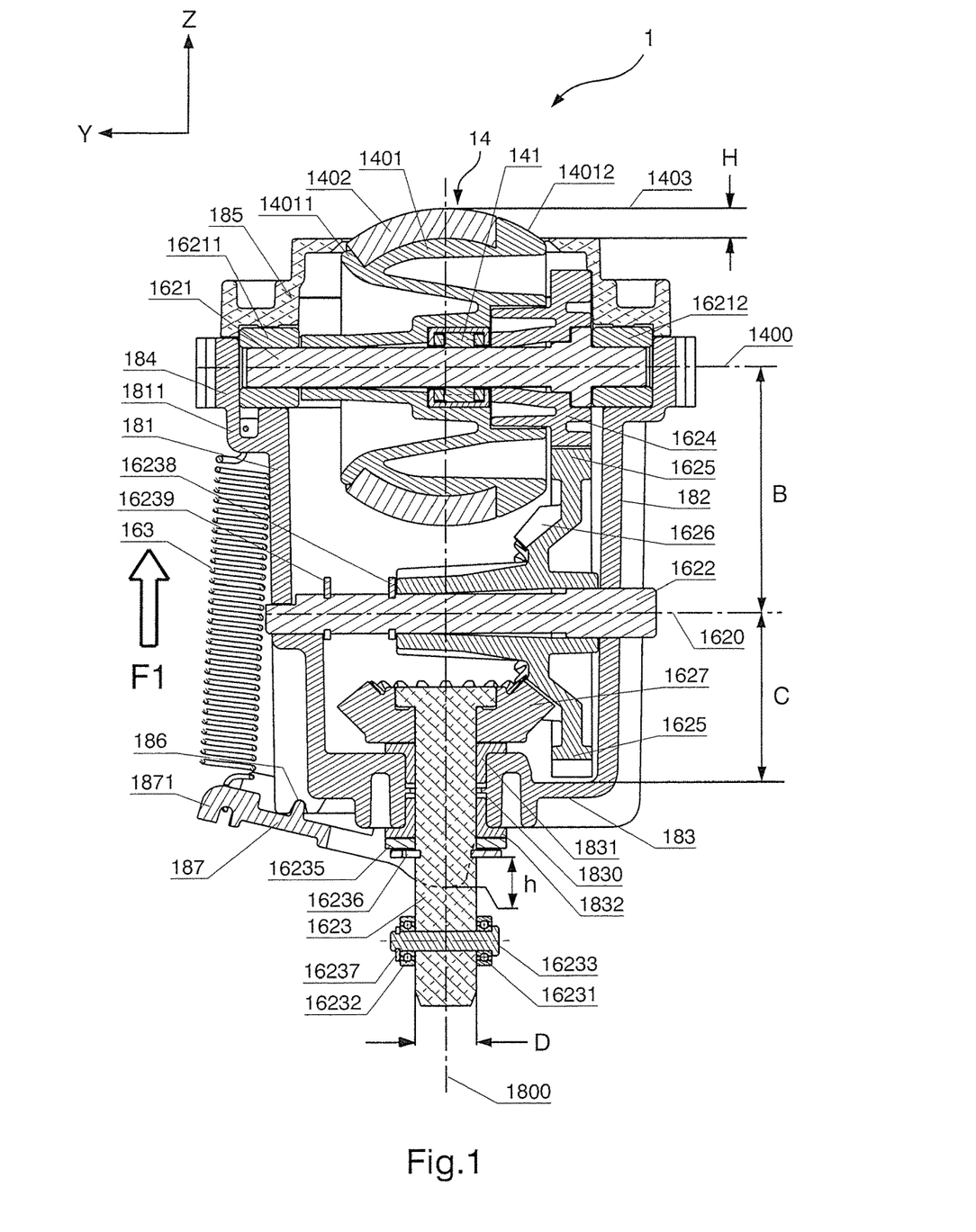
FIG. 1 is a longitudinal section of a transport module according to the invention.

FIG. 1 shows a longitudinal section of a transport module 1 according to the invention. A rotation axis 1800 of the transport module 1 is at the same time the axis of a drive shaft 1623 on the foot of the transport module 1. The transport module 1 has on its head-side end a transport element 14 having a height H effective for the traction so that it can exert a traction force on the flat items in the transport direction or the alignment direction of the transport element. The transport element 14 is rotatably borne in a frame-shaped transport element carrier and is driven by the drive shaft 1623. The drive shaft 1623 has a diameter D and extends in the z-direction of a Cartesian coordinate system.

In the view according to FIG. 1, a rotation axis 1400 of the transport element 14 extends in y-direction. This direction, however, can be changed in any direction by a rotation via the rotation axis 1800 of the transport module 1, wherein the rotation of the transport module can be effected on demand by a direction alignment mechanism (not shown) that is mechanically coupled with an annular external gear rim on a carrier ring 184 of the transport element carrier of the frame-shaped transport element carrier.

Each of the transport elements 14 and their transmission means 1621 to 1627 are respectively mounted on a frame-shaped transport element carrier that has two opposite lateral legs 181, 182 connected with each other by a carrier yoke 183 on the bottom of the transport element carrier. The carrier ring 184 of the transport element carrier is formed in the upper part of the transport element carrier and, in an assembled transport module, abuts on a circular bearing ring on the underside of the placement deck, wherein a first rotary shaft 1621 arranged below an opening in the placement deck carries the transport element which extends in z-direction through said opening with a lateral running surface 14012 of its molded body of rotation and with its barrel-shaped rubber coat 1402. The barrel-shaped rubber coat 1402 is mounted on the molded body of rotation 1401 of the transport element 14 and has a friction value µ that, depending on the combination of materials, is within a pre-defined range.

The first rotary shaft 1621 is borne on both sides in slide bearings 16211, 16212 that were fitted in respectively adapted recesses on the edge of an inner space of the carrier ring 184. A retaining ring 185 of the transport element 14 is slipped on the carrier ring 184 so as to prevent a falling-out of the transport element 14 together with its shaft 1621 with slide bearings 16211, 16212 from the inner space of the carrier ring. The retaining ring 185 of an assembled transport module has a surface that is flush with the surface of the placement deck so that an equator 1403 of the barrel-shaped rubber coat reaches a maximum height U above the surface of the placement deck. A lateral outer edge 14011 of the molded body of rotation and the lateral running surface 14012 of the molded body of rotation 1401 limit the rubber coat to 60% to 80% of the running surface of the transport element 14. A free-wheeling hull 141 of the transport element is arranged on the first rotary shaft 1621 in the center of the molded body of rotation 1401.

The transmission means comprise, apart from the first rotary shaft 1621 with slide bearings 16211,16212, also a first fixed bearing axle 1622 of a second gear wheel 1625 with a firmly connected bevel gear 1626 rotatably borne on a fixed bearing axle 1622. The transmission means further comprise a first gear wheel 1624 that is firmly connected by positive joint with the first rotary shaft and the teeth of which are in engagement with the teeth of the second gear wheel 1625. The central line 1620 of the fixed bearing axle 1622 has a distance B to the rotation axis 1400 of the transport element 14. On the fixed bearing axle 1622, there is provided a first lock washer 16238 for limiting the play of the second gear wheel 1625 in direction of the central line 1620 and a second lock washer 16239 close to the lateral leg 181. The second gear wheel 1625 has a radius that is smaller than a distance C between the fixed axle 1622 and the inner wall of the yoke, the yoke 183 of the transport element carrier 18 having in its middle a central opening 1830 for two radial slide bearings 1831, 1832 in which the drive shaft 1623 is rotatably borne. A lock washer 16236 prevents a slipping of the drive shaft 1623 in z-direction. A washer 16235 is arranged between the lock washer 16236 and the radial slide bearing 1832.

The bevel gear 1626 firmly connected with the second gear wheel 1625 is in engagement with a bevel gear 1627 that is connected by positive joint with the drive shaft 1623.

Apart from the drive mechanism and the transmission means, there are provided spring means, preferably a tension spring 163 and a lever 187 on the transport element carrier, the latter being shiftable in axial direction due to a force F2 contrary to the spring force F1. By the effect of the force F2, the transport module 1 goes down below the surface 1201 of the placement deck 12, which allows for a limitation of the friction value when a respectively matched spring force F1 has been chosen. The tension spring 163 is mounted on the side of the yoke 181 in a hanging opening 1811 on the one end and, on the other end, on a hook 1871 on the lever end of a lever 187 close to the yoke 183. The tension spring is pre-tensioned after it has been mounted on the transport element carrier 18. The lever 187 is tiltably borne in a groove 186, said groove being formed in the lower end of the lateral leg 181 of the transport element carrier close to the yoke.

The drive shaft 1623 of the transport module has low-friction bearings 16231, 16232—preferably ball bearings—, a bearing pin 16233 for the bearings 16231, 16232 and a lock washer 16237 for the bearing pin 16233. Due to the bearings, the drive shaft 1623 is designed connectable to a toothed belt disc (shown in FIG. 3) by positive lock, but shiftable in axial direction. This way, the drive shaft 1623 gets a shape contour in its cross section that will be further explained under FIG. 5 below.

Figure 2:
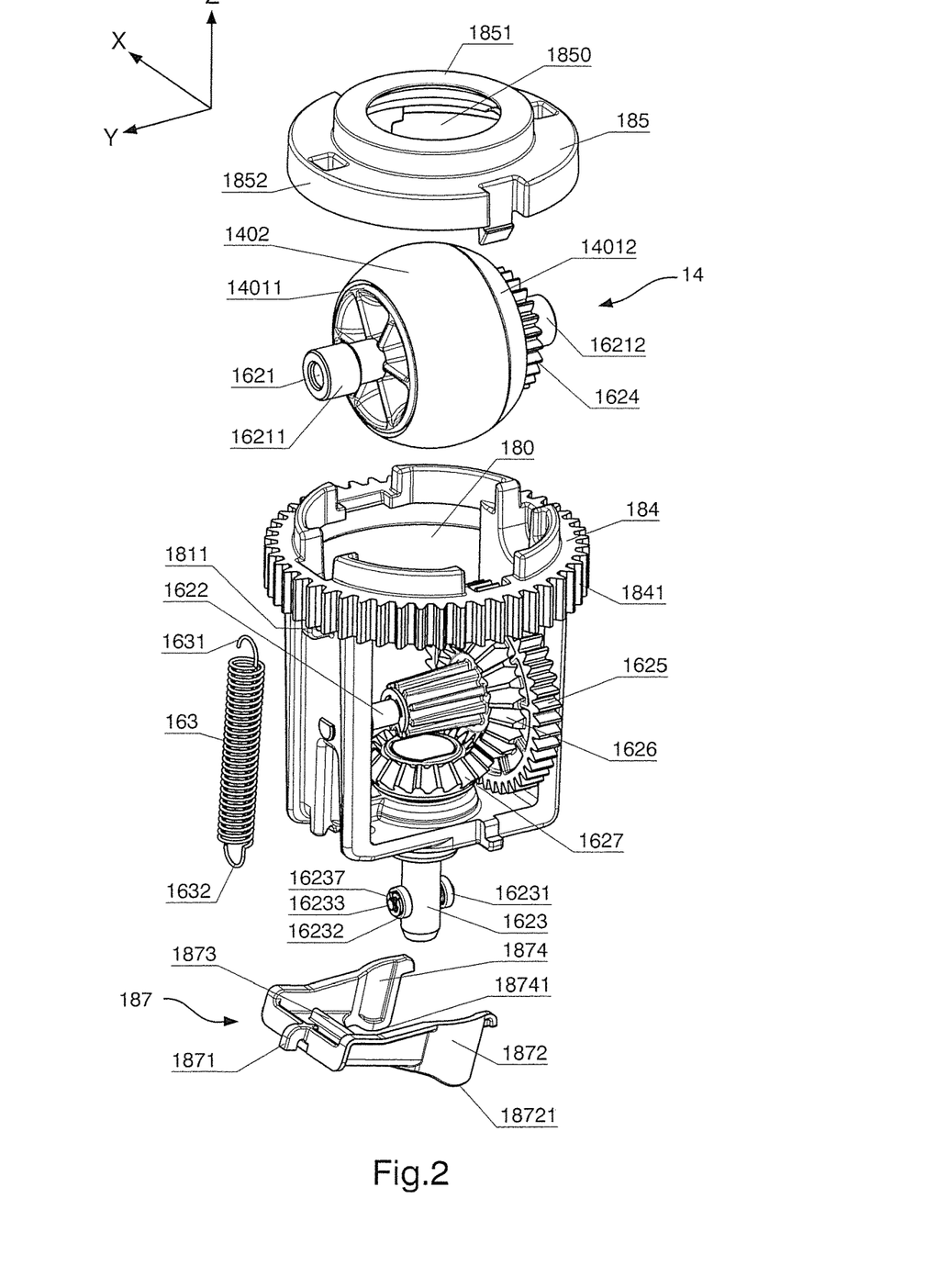
FIG. 2 is an exploded perspective view of the transport module.

FIG. 2 shows an exploded perspective view of the transport module. Contrary to the z-direction, i.e. in the direction of gravity in a transport module installed in a station of the item processing system, the following components of the transport module are presented:

A retaining ring 185 of the transport element 14 that can be slipped on the carrier ring 184 and fixed to the latter by means of a snap-in connection is stepped in a disc-shaped manner in z-direction and has a circular opening 1850 in an upper circular disc that has a smaller diameter. The upper circular disc of the retaining ring has a surface 1851 in z-direction. The lower circular disc of the retaining ring has an annular collar on its outer diameter 1852 that can be slipped on a structure on the head side of the transport module and serves as head-side bearing on the underside of the placement deck.

The structure on the head side in the inner space of a central opening 180 of the carrier ring 184 is formed on a respective first end of the lateral legs 181, 182 of the transport element carrier and shaped in such a manner that the slide bearings 16211, 16212 of the first rotary shaft 1621 can be fitted. The transport element 14 and a first gear wheel 1624 are firmly connected by positive joint with the first rotary shaft. The transport element 14 carries a barrel-shaped rubber coat 1402 with a pre-defined friction value on the molded body of rotation, said rubber coat 1402 being arranged between a lateral outer edge 14011 and the lateral running surface 14012 of the molded body of rotation. The carrier ring 184 carries an annular external gear rim 1841.

Close to a lateral leg (182 see FIG. 1), there are shown a second gear wheel 1625 and a bevel gear 1625, that are firmly connected with each other and rotatably borne on the fixed bearing axle 1622, wherein a bevel gear connected with the drive shaft 1623 by positive joint drives said bevel gear 1625. On the drive shaft 1623 of the transport module, there are oppositely arranged two low-friction bearings 16231, 16232, preferably ball bearings, that are mounted on a bearing pin 16233 which is fixed by means of a lock washer 16237.

On the other lateral leg (181 see FIG. 1), there is provided a hang-in opening 1811 for the eyelet 1631 of a tension spring 163 the other eyelet 1632 of which can be hung-in on a hook 1871 of a lever 187. The lever 187 has, on its shorter lever arm i.e. on a part of the lever that is closer to the hook 1871, a rotation edge 1873 of the lever 187 at a distance to the hook 1871. The lever 187 has, on its other longer lever arm, i.e. on the end opposite the hook 1871, a fork of two lever arms 1872, 1874 which have lever ends 18721, 18741 effective for limiting the friction value that bear against a bearing plate (19a see FIG. 3).

Figure 3:
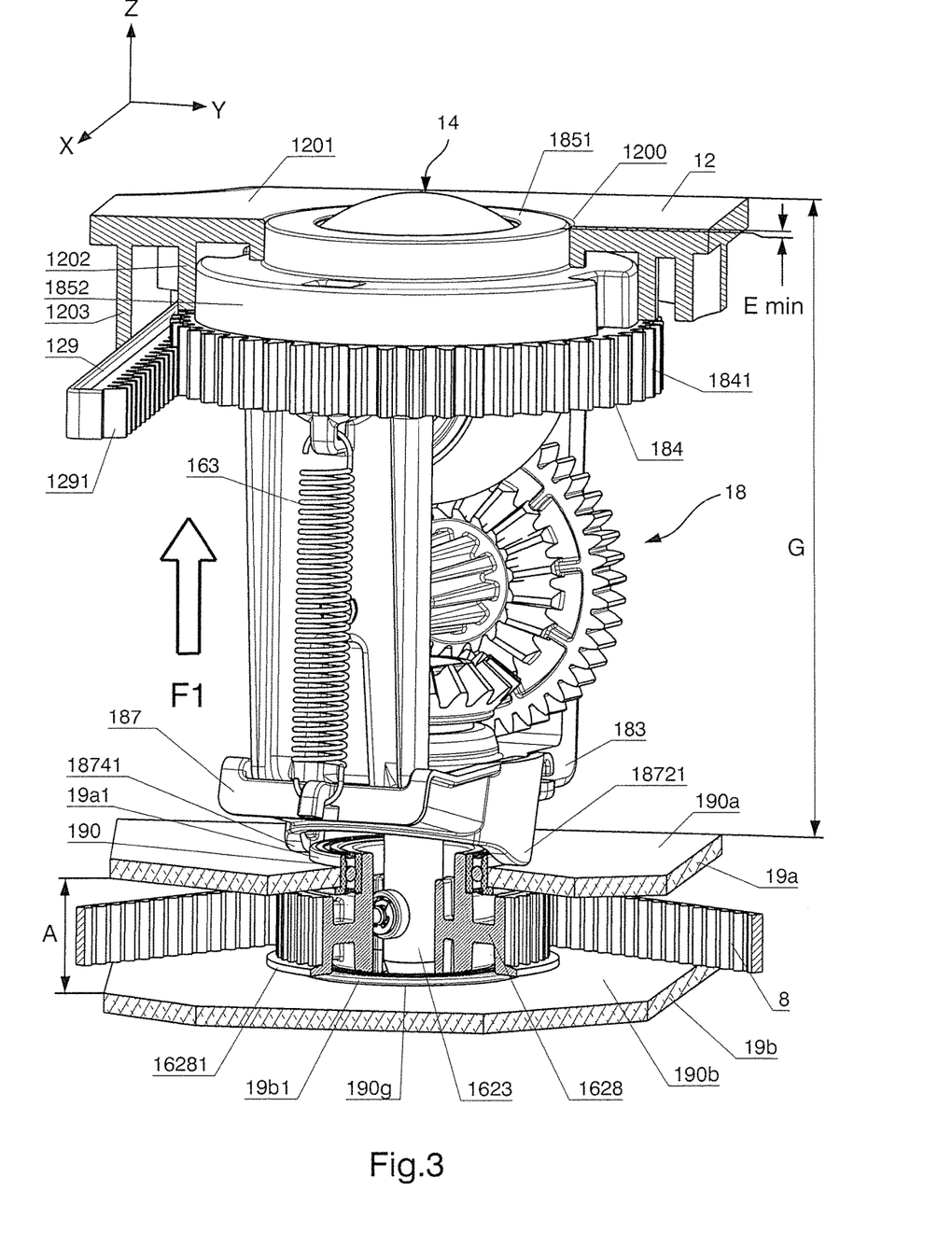
FIG. 3 is a perspective view of a section of the placement station from the upper right with an installed transport module in a first state.

FIG. 3 shows a perspective view of a section of the placement station from the upper right with an installed transport module in a first state without limitation of the friction value. The transport element carrier 18 is arranged between the placement deck 12 of the placement station and a bearing plate 19a arranged in a between-deck manner, wherein, on the one hand, the lever ends effective for limiting the friction value 18721, 18741 of the lever 187 bear against the surface 190a of the bearing plate 19a and, on the other hand, the rotation edge (1873 see FIG. 2) lies on the carrier yoke 183 so that, due to the force F1 of the tension spring 163, the transport module is maximally lifted in z-direction so that a fourth distance E between the surface 1201 of the placement deck and the surface 1851 of an upper circular disc of the retaining ring (185, see FIG. 2) becomes minimal. Consequently, the transport element 14 extends beyond the surface of the placement deck 1201 by a height H effective for the traction. A fifth distance G of the surface of the placement deck 1201 to the top side of the bearing plate 19a, without the projection H (FIG. 1) of the barrel equator 1403 of the transport element 14 over the surface of the retaining ring 1851, corresponds to the length of the assembled transport module in z-direction without limitation of the friction value.

A circular opening 1200 in the placement deck 12 is provided for receiving the upper circular disc of the retaining ring (185, see FIG. 2), the retaining ring preventing the falling-out of the transport element 14 from the inner space of the carrier ring 184.

The annular collar on the outer diameter 1852 of the lower circular disc of the retaining ring (185, see FIG. 2) is shaped as a head-side bearing that is borne within a circular bearing ring 1202 formed on the underside of the placement deck 12. A first foot-side bearing 19a1 is arranged in a bearing hole 190 of the bearing plate 19a, wherein a toothed belt disc 1628 is rotatably borne in the bearing 19a and the drive shaft 1623 is shiftably borne in a central opening of the toothed belt disc 1628. The bearing shall have a low friction; preferably a ball bearing is used. The toothed belt disc 1628 has an outer edge of the toothed belt disc 16281 with a diameter larger than the diameter of the toothed belt disc. In the bearing 19a, there is inserted a cylindrical shaped part of the toothed belt disc 1628 with the central opening, wherein the cylindrical shaped part is also inserted on the opposite side in a second bearing 19b1 that is arranged in a second bearing hole 190g of a counter-bearing plate 19b so that the toothed belt disc 1628 is rotatably borne. Also the bearing 19b1 shall have a low friction; preferably a ball bearing is used here, too. In the figure, the top side 190b of the counter-bearing plate 19b conceals the cylindrical shaped part and the second bearing 19b1, but these two bearings are of equal dimensions.

Via a movement mechanism for changing the alignment direction of some of the transport elements 14, an actuating means (not shown) can be mechanically coupled with a toothed rack 129 of a direction alignment mechanism. The toothed rack 129 has teeth 1291 at least on one side which teeth are in engagement with the teeth of a circular external gear rim 1841 of a carrier ring 184. The carrier ring 184 rotates with a movement of the toothed rack 129 that moves within a space that is limited in a direction opposite to the y-direction by a guide wall 1203 formed on the underside of the placement deck 12.

As an alternative to the actuating means, a drive means can be mechanically coupled with the toothed rack 129 of a direction alignment mechanism via a movement mechanism, said drive means being driven by a control unit.

The transport module is borne rotatably around an axis of the drive shaft 1623 and arranged to be shiftable in axial direction, said drive shaft 1623 being arranged standing orthogonally on the bearing plate 19a and being oriented in axial direction parallel to the z-direction. The rotation axis of the transport module is simultaneously the axis of the drive shaft 1623.

Below the placement deck 12, there is provided a space for a common drive mechanism. A space is limited in z-direction by the first distance A between the bearing plate 19a and the counter-bearing plate 19b and is provided for a common drive for a plurality of transport modules. The common drive comprises a drive unit and for example a toothed belt 8 and the toothed belt disc 1628. The central opening of the toothed belt disc 1628 has a shape contour in axial direction (which will be explained on the basis of FIG. 5 below) in which the drive shaft 1623 of the transport module is borne by positive joint, but easily shiftable in axial direction (z-direction).

Figure 4:
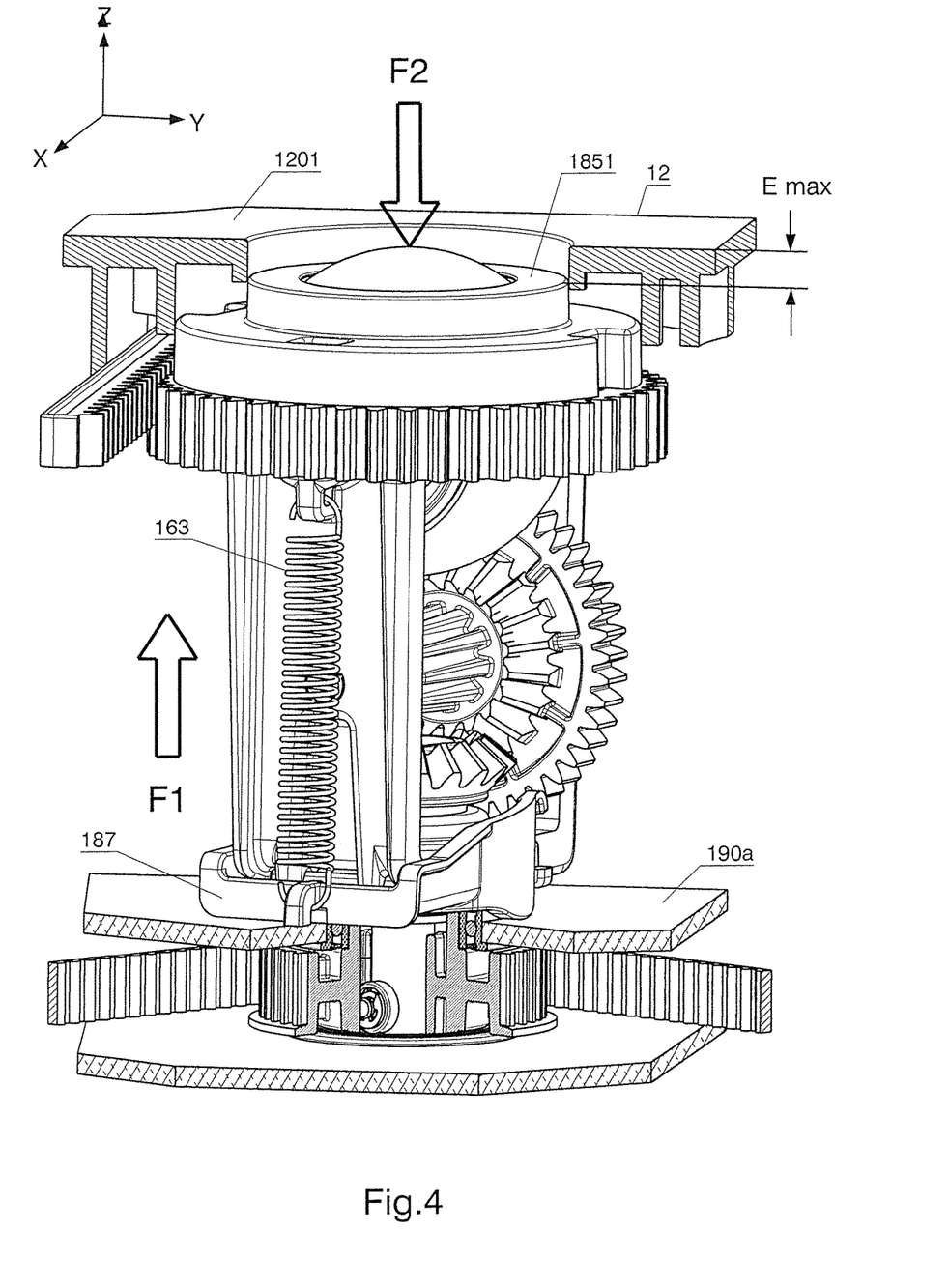
FIG. 4 is a perspective view of a section of the placement station from the upper right with an installed transport module in a second state.

FIG. 4 shows a perspective view of a section of the placement station from the upper right with an installed transport module in a second state with limitation of the friction value. Now the lever 187 is lying fully on the top side 190a of the bearing plate 19a. The fourth distance E between the surface 1201 of the placement deck 12 and the surface 1851 of an upper circular disc of the retaining ring (185, see FIG. 2) becomes maximal because, in the case where the pressure force F2 is bigger than the spring force F1, the transport module is not lifted in z-direction anymore by effect of the force F1 of the spring means 163. The transport element 14 goes down in the direction of gravity so that the transport element 14 does not project over the surface of the placement deck 1201 anymore. The minimum length of the installed transport module in z-direction in the second state corresponds to a difference of the fifth distance G of the surface of the placement deck 1201 to the top side 190a of the bearing plate 19a minus the fourth distance E between the surface of 1201 of the placement deck 12 and the surface 1851 of the upper circular disc of the retaining ring 185.

Figure 4A:
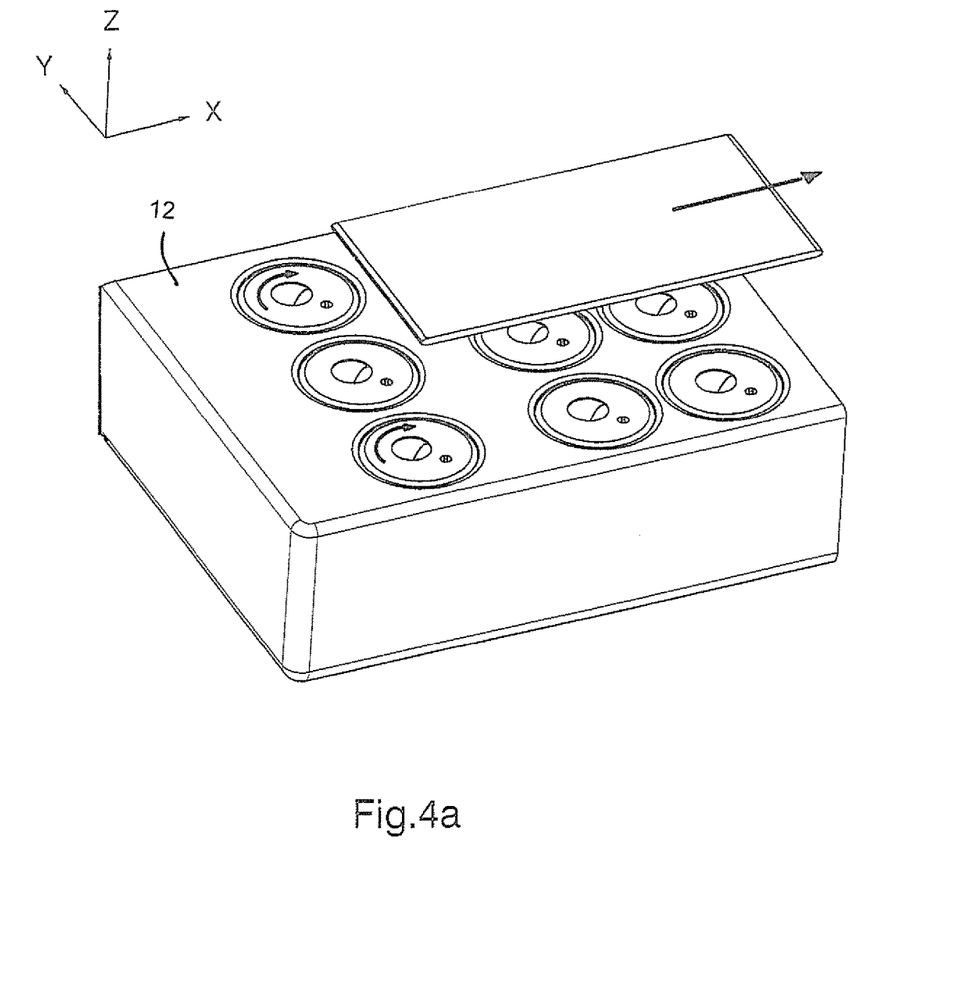
FIG. 4a schematically illustrates the placement deck, having multiple transport modules according to the invention.

FIG. 4a shows the placement deck 12 with multiple transport elements therein, over which a flat item is transported in the direction of the arrow.

Figure 5:
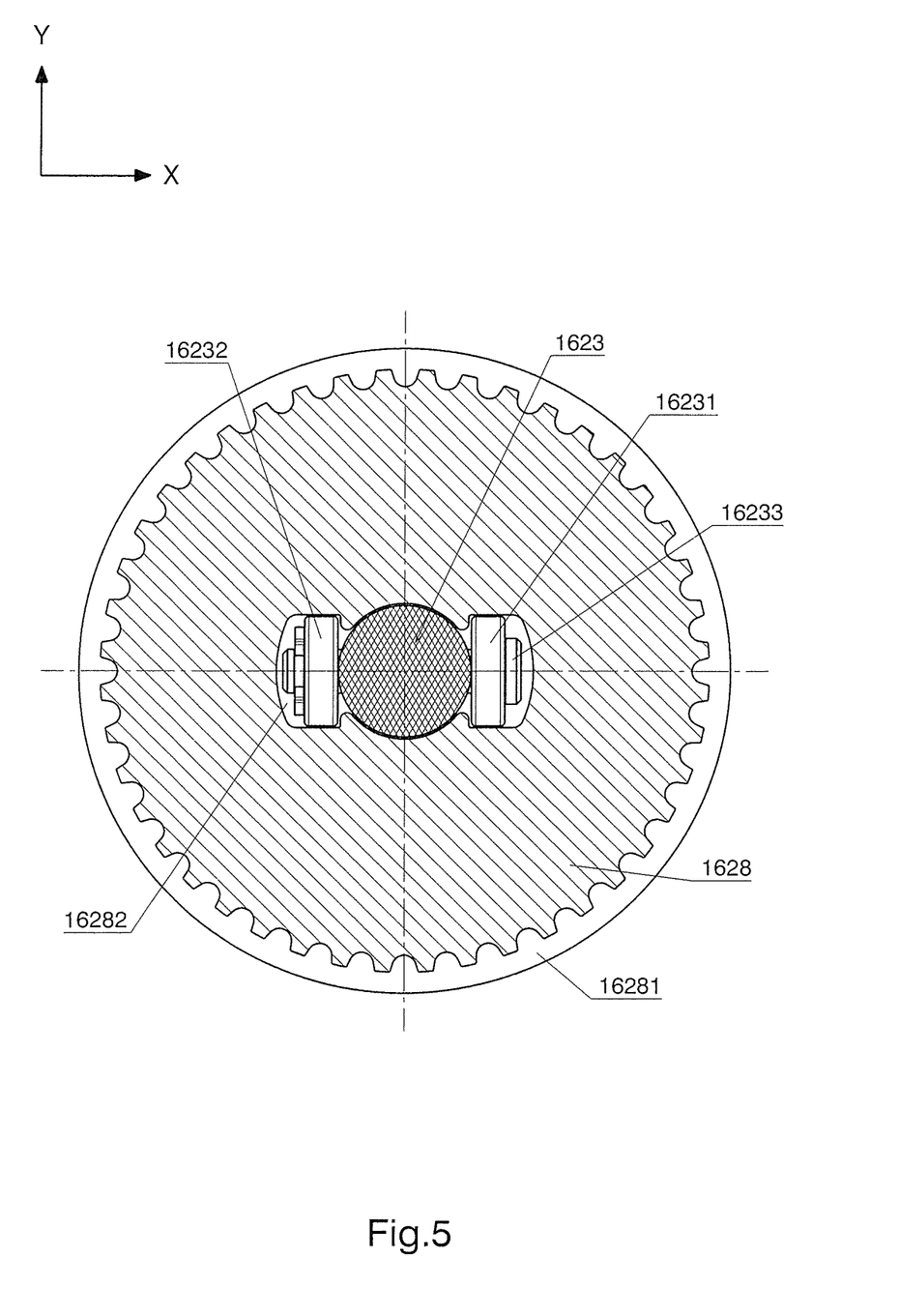
FIG. 5 is a cross-section of a toothed belt disc with inserted drive shaft of the transport module.

FIG. 5 shows a cross section of a toothed belt disc with inserted drive shaft of the transport module. The toothed belt disc has an outer edge of the toothed belt disc 16281 with a diameter larger than the outer diameter of the toothed belt disc 1628. The central opening of the toothed belt disc 1628 has a shape contour 16282 with a pre-defined profile in which the drive shaft 1623 of the transport module is borne by positive joint, but easily shiftable in axial direction (z-direction). On the drive shaft 1623 of the transport module, the low-friction bearings 16231, 16232 are arranged on a bearing pin 16233. The profile is shaped in a manner adapted to the dimensions of the diameter of the ball bearings mounted on the drive shaft. The diameter of the profile is slightly wider than the diameter of the ball bearings so that the drive shaft 1623 can be smoothly shifted in axial direction (z-direction).

Although modifications and changes may be suggested by those skilled in the art, it is the intention of the inventor to embody within the patent warranted hereon all changes and modifications as reasonably and properly come within the scope of his contribution to the art.

I claim as my invention:

1. Transport module for flat items comprising:
   a plurality of transport modules designed for installation in a station of an item processing systems, each transport module having an equal design;
   each transport module having at least one transport element mounted in a transport element carrier having a drive shaft;
   each transport element having an equator that divides a surface of the transport element into first and second sides, with said surface of said transport element having a lower friction coefficient on the first side than on the second side, and each transport element being driven by the drive shaft via a transmission of the respective transport module; and
   the transport element carrier having a spring assembly that allows shifting of the respective transport element carrier in and contrary to the direction of gravity and that carries the transmission of the transport module, the installed transport module rotatably around an axis of the drive shaft.

2. A transport module according to claim 1, wherein the transport element carrier has two lateral legs and a carrier yoke to form a frame.

3. A transport module according to claim 1 wherein:
   the transport element is mounted in a carrier ring that passes into the lateral legs in the direction of gravity, the transport element comprising a molded body of rotation rotatable around a rotation axis with a barrel-shaped rubber coat, and wherein the rotation axis precedes through a center point of a cross section of a first straight rotary shaft that rotates in bearings supported on a respective first end of the lateral legs of the carrier;

the two lateral legs are connected with each other by the carrier yoke at respective other ends of the lateral legs of the carrier;

the installed transport module is arranged shiftably against a spring force in the direction of gravity and contrary thereto in z-direction, wherein the drive shaft of an installed transport module projects in the direction of gravity from the transport element carrier in a length corresponding at least to a sum of a first distance and a stroke, the first distance being provided for a common drive of a plurality of transport modules and the stroke corresponding to a height of a circle segment on the equator of a cross section of the transport element that is effective for the traction;

a fixed straight axle is mounted in parallel to the first straight rotary shaft at a second distance below the first straight rotary shaft and at a third distance from the inner wall on the bottom of the carrier yoke in the lateral legs of the carrier;

the carrier yoke has in its center a bearing hole with a pre-defined bearing diameter for a first and a second radial slide bearing of the drive shaft;

the drive shaft has a diameter and is rotatably mounted in the first and second radial slide bearings, wherein the slide bearings of the transport module mounted below a placement deck of a placement station are mounted flush with a bearing hole of a bearing plate such that the axis of the transport element carrier proceeds through the center point of the cross section of the drive shaft and through the center point of the bearing hole;

a first gear wheel is mounted by positive joint on the first straight rotary shaft and a second gear wheel is rotatably borne on the fixed straight bearing axle, wherein, after their assembly in the carrier, with teeth of said first and second gear wheels in engagement with each other;

a first bevel gear is connected by positive joint with the drive shaft, and that a second bevel gear and the second gear wheel are jointly mounted on the second bearing shaft and connected with each other by positive joint and/or firm bonding, wherein the two bevel gears are oriented to one another and mounted in the carrier to form a bevel-gear rolling-contact gear unit; and the spring assembly comprises a tension spring and a lever, and the tension spring is respectively mounted on the transport element carrier.

4. A transport module according to claim 3, wherein:
when the transport module is installed below a placement deck of a placement station, the bearing hole of the carrier yoke and a bearing in in an opening of the bearing plate are aligned with one an-other, and that the spring assembly is mounted on the transport element carrier and effective between the carrier yoke and the bearing plate, so that a fourth distance between the surface of the placement deck and the surface of the retaining ring is minimal when no force is acting on the transport; and in the first state without limitation of the friction value, the maximum length of the installed transport module in z-direction corresponds to a fifth distance of the surface of the placement deck to the top side of the bearing plate.

5. A transport module according to claim 4, wherein the spring assembly comprises a tension spring that is pre-tensioned in an installation of the transport module on a bearing plate of a station of an item processing system and the drive shaft of a plurality of transport modules on the bearing plate of a station of an item processing system is arranged mountably assigned to a respective toothed belt disc, wherein the drive shaft of each of the transport elements is designed connectable with the respective one toothed belt disc by positive lock, but shiftable in axial direction, wherein the toothed belt disc has a central opening with a profile of a predefined cross section, said profile being shaped in a manner adapted to the dimensions of the diameter of the ball bearings mounted on the drive shaft.

6. A transport module according to claim 5, wherein the station of an item processing system is a placement station.

7. A transport module according to claim 6, wherein via a movement mechanism for changing the alignment direction of some of the transport elements, an actuator is mechanically coupled with a toothed rack of a direction alignment mechanism, said direction alignment mechanism being arranged in an area between the alignment wall and the front side of the placement station and below the placement deck.

8. A transport module according to claim 3, wherein the barrel-shaped rubber coat applied on the molded body of rotation is asymmetrically arranged in relation to its barrel equator so that, on the one side of the barrel equator, the surface of the transport element passes into a lateral running surface of the molded body of rotation that has a lower friction value than the rubber coat.

9. A transport module according to claim 8, wherein the actuator is a setting dial.

10. A transport module according to claim 1, wherein the flat items are mail items.

* * * * *